July 12, 1927.
G. W. MILLER
1,635,948
MECHANICALLY OPERATED FIGURE TOY
Filed Sept. 1, 1926　　2 Sheets-Sheet 1
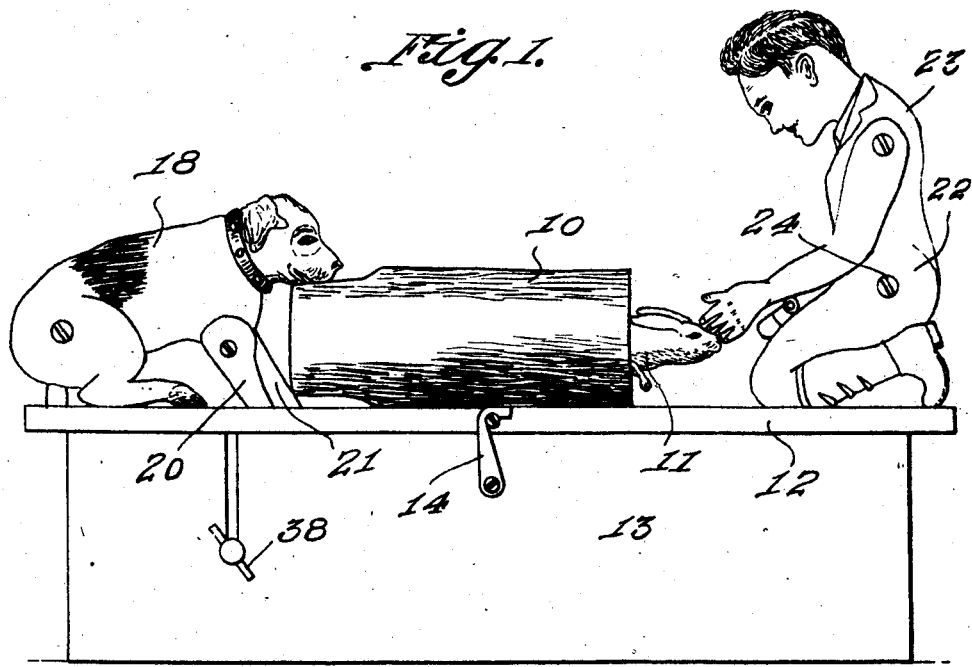
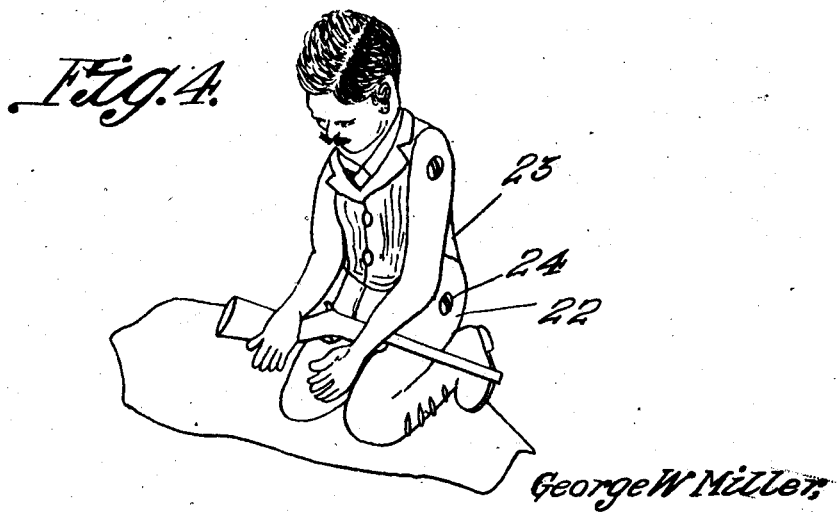

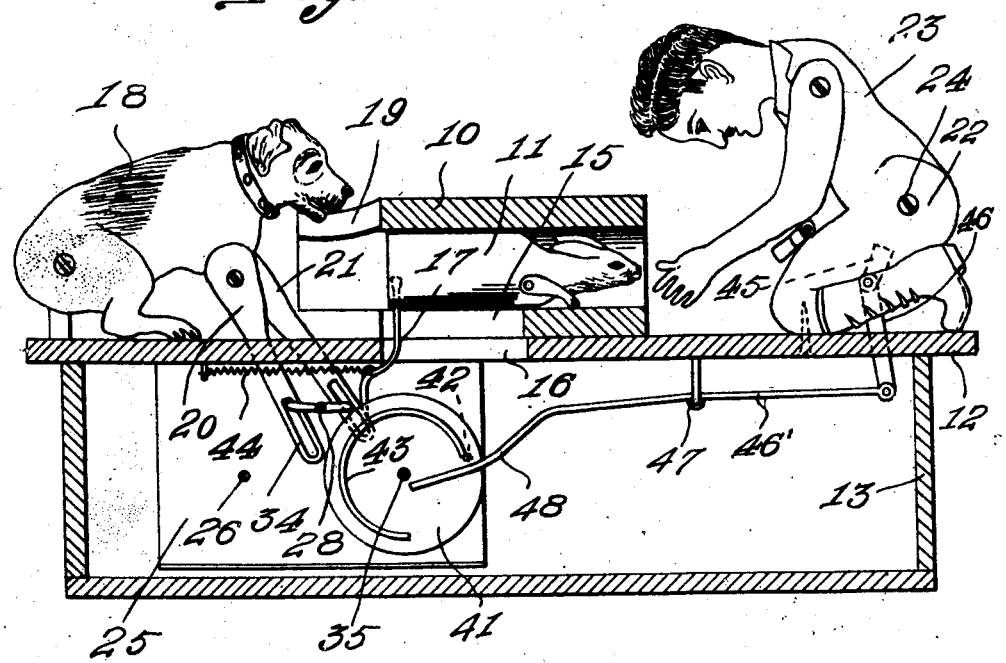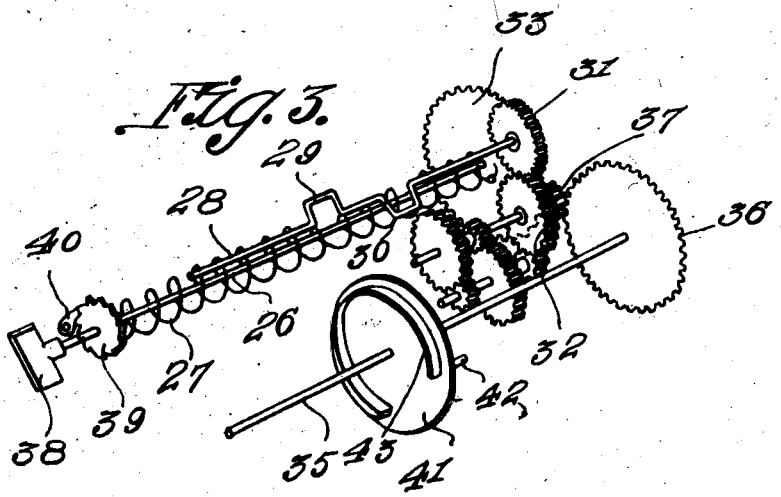

Patented July 12, 1927.

1,635,948

UNITED STATES PATENT OFFICE.

GEORGE W. MILLER, OF WAYNESVILLE, NORTH CAROLINA.

MECHANICALLY-OPERATED FIGURE TOY.

Application filed September 1, 1926. Serial No. 133,047.

This invention relates to toys and contemplates a structure operable to represent a hunter and his dog endeavoring to catch an animal entrapped in a hollow member, the parts being arranged and timed for movements in a manner calculated to afford considerable pleasure and amusement to young folks.

In carrying out the invention I arrange an animal-like figure within the hollow member, and intermittently project the figure from one end of the member by a figure actuating mechanism affording the representation of a dog chasing the animal-like figure through the hollow member from one end thereof, with a figure representing a hunter in a squatted position at the other end of the tubular member, which last mentioned figure is mounted for intermittent movement toward and away from the member to represent the hunter attempting to catch the animal as it is projected from the member, the movements of the last mentioned figure being timed or controlled so that the said figure moves in the direction of the hollow member just as the animal-like figure is retracted within the latter.

An important object of the invention resides in the provision of an operating mechanism for the movable parts of the toy, wherein the figure actuated means for the animal-like figure controls the movements of the figure representing the hunter, so that the latter is released to gravitate in the direction of the animal-like figure, with outstretched hands, indicating an attempt to grab the animal, just as the figure is returned to its normal position within the hollow member.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a side elevation of the toy showing the animal-like figure projected beyond one end of the hollow member, and the position it occupies just prior to its return within the member, and the movement of the figure representing the hunter.

Figure 2 is a sectional view showing the position occupied by the figure representing the hunter, when the animal-like figure is retracted within the hollow member.

Figure 3 is a view of the figure actuated mechanism for moving the animal-like figure to its projected position.

Figure 4 is a detail view of the figure representing the hunter in a squatted position.

Referring to the drawings in detail 10 indicates a hollow member and is adapted to preferably represent a hollow log or the like in which a figure 11 representing a rabbit or other animal is trapped, this animal-like figure being mounted for sliding movement so that it can be moved to a projected position beyond one end of the member 10 as shown in Figure 1, and subsequently returned to its normal position as shown in Figure 2. The hollow member 10 is supported upon a base 12 which preferably forms a top of a box-like casing 13 in which the operating mechanism for the toy is housed, the mechanism being supported by the base or cover 12 as shown. The cover 12 is held fixed upon the casing 13 by a suitable latch element 14. The hollow member 10 is provided with an opening 15 which registers with a similar opening 16 in the top of the casing, while an arm 17 depends from the body of the animal-like figure 11 to operate in these openings, the arm extending within the casing 13 for a purpose to be hereinafter described.

Mounted upon the cover 12 of the casing and arranged at one end of the hollow member 10 is a toy figure 18 representing a dog, with its head partly received by an opening 19 in the top of the member 10, this arrangement giving the appearance of the dog chasing the animal-like figure 11 through the hollow member. The movements of the figure 11 are controlled by means which imparts movements to the front legs 20 and 21 respectively of the dog-like figure 18.

Arranged upon the cover 12 at the other end of the hollow member 10 is a figure representing a hunter in a squatted position with outstretched hands, this figure being indicated generally at 22, while the body 23 of the figure is mounted for pivotal movement on the pivot 24 whereby said figure can move toward and away from the hollow member 10, affording the appearance of the hunter attempting to catch the animal-like figure as it is projected from one end of the member. The normal position of this figure 22 is shown in Figure 1, and the active position of the figure is as shown in Figure 2. This figure is intermittently operated in a manner to be hereinafter described, and its movements timed with relation to the movements of the animal-like figure 11, so that it moves in the direction of the figure 11 just as the latter is retracted within the hollow member 10.

Depending from the under side of the cover 12 is a housing 25, between the opposed side walls of which is journaled a spring actuated shaft 26, the spring for which is indicated at 27 and associated therewith to rotate the shaft in the ordinary well known manner. Also journaled between the sides of the housing 25 is a shaft 28 having oppositely disposed offset crank portions 29 and 30 respectively at points between its ends. This shaft 28 is provided with a small gear 31 at one end thereof which meshes with the adjacent gear of a train of gears indicated at 32, and which train of gears are rotated by means of a toothed wheel 33 carried by the spring actuated shaft 26. Consequently when the shaft 26 is rotated under the influence of the spring 27, movement is imparted to the train of gears from the toothed wheel 33, and as the gear 31 carried by the shaft 28 meshes with the train of gears mentioned, the shaft 28 is rotated. It will be noted upon inspection of Figure 2 that the front legs of the dog-like figure 18 project within the casing 13 through slots in the cover 12, and these legs are provided with longitudinal slots 34 to receive the crank portions 29 and 30 respectively of the shaft 28. Therefore when the shaft 28 is rotated, the legs 20 and 21 of the dog-like figure are given motion, being alternately moved forwardly and rearwardly, by reason of the crank arrangements above described.

Also journaled between the opposed sides of the housing 25 is a shaft 35 one end of which is provided with a toothed wheel 36 which meshes with the adjacent gear 37 of the train of gears above mentioned. A pivoted pawl (not shown) is adapted to engage the toothed wheel 36 to hold the operating mechanism inactive, while the shaft 26 is being rotated by means of the key 38 for the purpose of rewinding the spring 27. A ratchet disk 39 is carried by the shaft 26 and is engaged by a pawl 40 which holds the shaft 26 against retrograde movement while the spring is being rewound. Mounted centrally of the shaft 35 is a disk 41 from one side of which projects a lug 42, while carried by the other side of the disk is a substantially annular flange 43. This flange however has its ends spaced apart, but extends about the major portion of the disk as shown in Figure 3. The lug 42 is used to move the animal-like Figure 11 to its projected position as shown in Figure 1, the arm 17 carried by said figure being disposed in the path of movement of the lug 42. Consequently with each revolution of the disk 41 the animal-like figure 11 is moved to its projected position beyond one end of the hollow member 10. A coil spring or other yieldable element 44 has one end secured to the arm 17 and its other end secured to the cover 12, so that when the lug 42 moves away from, or out of engagement with the arm 17, the spring 44 functions to quickly retract the animal-like figure from the position shown in Figure 1 to its normal position illustrated in Figure 2.

The pivoted body portion 23 of the figure representing the hunter is provided with an apertured lug 45 which is pivotally connected with the adjacent end of a link 46, this link passing downwardly through an opening in the cover 12 and pivotally connected with the adjacent end of an operating rod 46'. This rod is fulcrumed in any suitable manner at a point between its ends as at 47, while the other end of the rod is offset as at 48 in the direction of the disk 41, and disposed in the path of movement of the flange 43. As shown in Figure 2, when the uninterrupted portion of the flange 43 is arranged directly above the rod 46', the body portion 23 of the figure representing the hunter gravitates in a direction of the hollow member 10, to occupy the position shown in Figure 2, indicating an effort on the part of the hunter to grab the animal-like figure 11. As hereinabove stated this movement of the figure representing the hunter takes place while the animal-like figure is in a projected position, but said figure is retracted within the hollow member 10 with greater rapidity than the fall of the figure representing the hunter, so that the said figure 23 never succeeds in catching hold of the animal-like figure.

In practice, the mechanism is held against movement in the manner above described while the spring 27 is being rewound, and when it is released, the shafts 26, 28 and 35 rotate in unison, all being geared by the train of gears above referred to. The ratio of these gears is such that the shaft 28 rotates considerably faster than the shaft 35, thus imparting a very quick motion to the forward legs of the dog-like figure 18. As the disk 41 rotates, the lug 42 is brought into contact with the arm 17 of the animal-like figure, and remains in contact with said arm until the figure is projected beyond one end of the hollow member 10 to the position shown in Figure 1. Just as soon as the lug moves away from the arm 17, the spring 44 retracts the animal-like figure to its position within the hollow member 10. During the rotation of the disk 41, the flange 43 rides over the adjacent end of the operating rod 46', and holds the rod pushed downwardly, and the body portion 23 of the figure 22 in the position shown in Figure 1. The flange remains in contact with the rod 46' during practically the complete revolution of the disk 41, and during the time the animal-like figure 11 is being projected beyond the end of the member 10. The lug 42 leaves the arm 17 at practically the same time the flange 43 releases the arm 46', so that the pivoted body portion 23 of the figure representing the hunter with outstretched hands gravitates toward the animal-like figure 11 while the latter is still projected, but both figures moving in the same direction at the same time, with the animal-like figure 11 being retracted considerably faster than the fall of the body portion 23 of the other figure. The relative arrangement of the working parts of the toy and the manner in which they are timed for movement produces a very interesting and attractive toy of the class in question.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. In a device of the character described, a hollow member, an animal-like figure normally arranged within the member, means intermittently projecting the figure beyond said member a predetermined distance, means for retracting said figure within the member from its projected position, a figure representing a hunter disposed at one side of the member and having arms extending toward the latter, said last mentioned figure being pivotally mounted to graviate toward said member, and means controlled by the first mentioned means for normally holding said figure spaced from the member and allowing said figure to gravitate in the direction of the member at a predetermined interval.

2. In a device of the character described, a hollow member, an animal-like figure normally positioned within the member and mounted for sliding movement, means for moving said figure and intermittently projecting it beyond said member a predetermined distance, a figure representing a dog arranged at one end of the member and including movable legs, said means including a crank shaft for operating said legs, a figure representing a hunter arranged at the other end of said member and pivotally mounted to gravitate toward said member, and means controlled by the first mentioned means for normally holding the last mentioned figure spaced from said member, and allowing said figure to gravitate in the direction of said member as the animal-like figure is being retracted.

3. In a device of the character described, a hollow member, an animal-like figure normally arranged within the member, a dog-like figure arranged at one end of the member and including movable legs, means for operating said legs and simultaneously imparting sliding movement to the animal-like figure to intermittently project the latter beyond one end of the member a predetermined distance, an additional figure arranged at the other end of said member and representing a hunter, said last mentioned figure including a body mounted for pivotal movement toward and away from said member, means for retracting the animal-like figure from its projected position, and means controlled by the first mentioned means for regulating the movements of said pivoted body of the last mentioned figure, whereby the latter moves in the direction of said member with the return of the animal-like figure within said member.

4. In a device of the character described, a hollow member, an animal-like figure normally arranged within the member, and mounted for sliding movements, means for intermittently projecting said figure a predetermined distance beyond one end of said member, means for retracting said figure within the member after each operation, a dog-like figure arranged at one end of the member and including movable legs actuated by said means, a figure representing a hunter squatted in advance of said member and having outstretched arms, the body portion of the last mentioned figure being mounted for pivotal movement toward and away from said member, and means controlled by the first mentioned means for normally holding the body portion in an upright position and operable to release said body portion to allow the latter to gravitate in the direction of said member simultaneously with the return of the animal-like figure within the member.

In testimony whereof I affix my signature.

GEORGE W. MILLER.